(12) United States Patent
Kline

(10) Patent No.: US 8,919,194 B2
(45) Date of Patent: Dec. 30, 2014

(54) LIQUID LEVEL GAUGING SYSTEM WITH BUBBLE SHEDDING REFLECTORS

(75) Inventor: Bruce R. Kline, Starksboro, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 303 days.

(21) Appl. No.: 13/603,862

(22) Filed: Sep. 5, 2012

(65) Prior Publication Data

US 2014/0060177 A1    Mar. 6, 2014

(51) Int. Cl.
*G01F 23/284*    (2006.01)

(52) U.S. Cl.
USPC .......................................................... 73/290 V

(58) Field of Classification Search
USPC ................................................. 33/290 V, 293
See application file for complete search history.

(56) References Cited

U.S. PATENT DOCUMENTS

| | | | | |
|---|---|---|---|---|
| 5,614,831 A * | 3/1997 | Edvardsson | ................. | 73/290 V |
| 7,802,470 B2 * | 9/2010 | Kotz et al. | .................. | 73/290 V |
| 8,248,888 B1 | 8/2012 | Enzler et al. | | |
| 2005/0150291 A1 * | 7/2005 | Voss | .............................. | 73/290 V |
| 2005/0284217 A1 * | 12/2005 | Miyagawa et al. | ......... | 73/290 V |
| 2008/0060431 A1 * | 3/2008 | Frovik | ......................... | 73/290 V |
| 2012/0123706 A1 * | 5/2012 | Armitage et al. | ........... | 73/290 V |
| 2014/0182370 A1 * | 7/2014 | Kienzle | ....................... | 73/290 V |

FOREIGN PATENT DOCUMENTS

| | | |
|---|---|---|
| DE | 4220714 A1 | 1/1993 |
| GB | 2270160 A | 3/1994 |
| WO | WO-9834094 A1 | 8/1998 |

OTHER PUBLICATIONS

Extended European Search Report dated Mar. 13, 2014 for Application No. EP13182660.4.

* cited by examiner

*Primary Examiner* — G. Bradley Bennett
(74) *Attorney, Agent, or Firm* — Edwards Wildman Palmer LLP; Joshua L. Jones; Alicia J. Esposito

(57) ABSTRACT

A reflector target includes a reflector defining a tapered reflector surface. The reflector includes an apex opening and an opposed base opening, wherein the base opening has a larger perimeter than the apex opening. The tapered reflector surface extends between the openings forming a tapered passage there-between. The tapered reflector surface is configured to resist the accumulation of surface bubbles on the reflector surface by movement of bubbles along the reflector surface out through the apex opening.

20 Claims, 7 Drawing Sheets

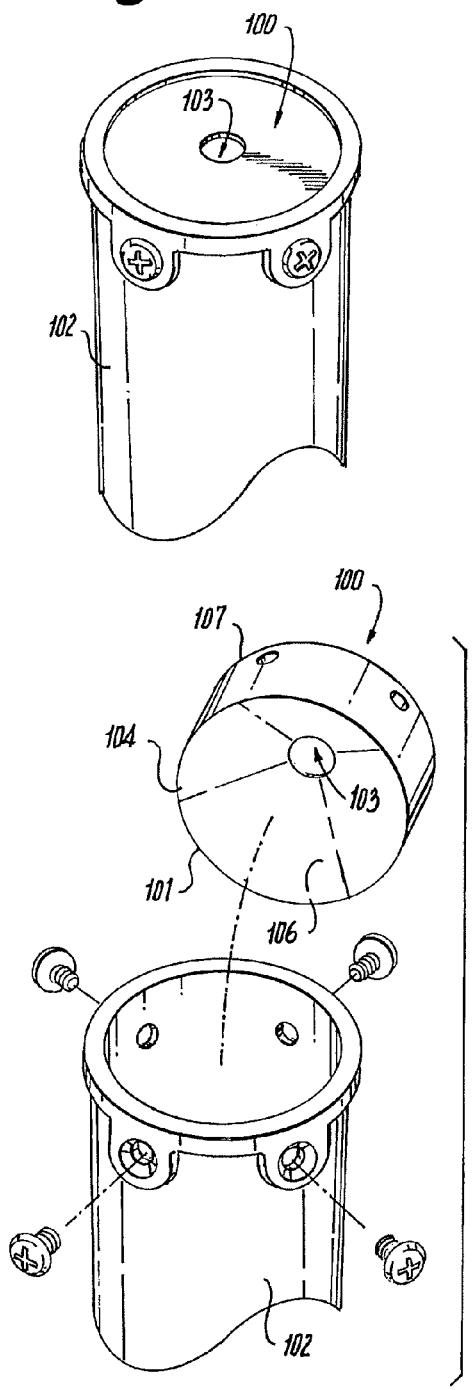
Fig. 4
Fig. 5
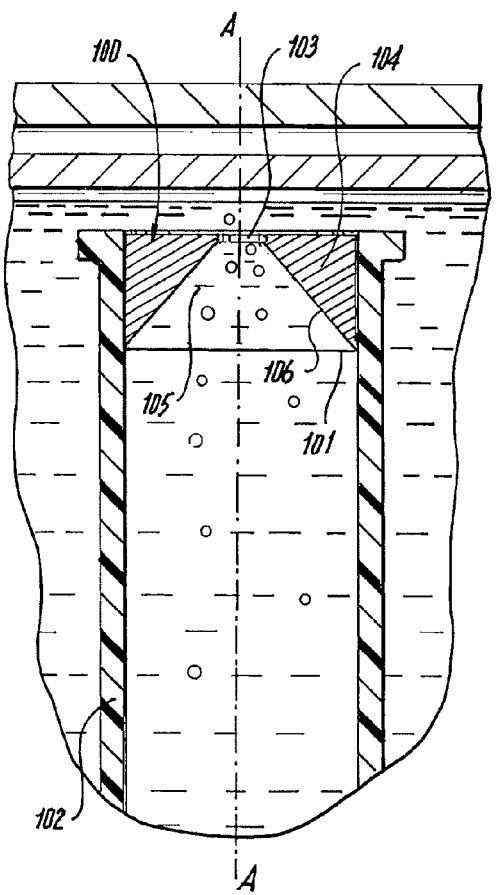
Fig. 6

LIQUID LEVEL GAUGING SYSTEM WITH BUBBLE SHEDDING REFLECTORS

BACKGROUND OF THE INVENTION

1. Field of the Invention

The present invention relates to reflectors for use in liquid level gauging systems such as those used in fuel tanks, and more particularly to reflectors that shed bubbles.

2. Description of Related Art

A variety of devices are known in the art for monitoring and detecting liquid levels, for example, for determining the level of remaining fuel in a fuel tank. Of such devices, many include ultrasonic signals to determine liquid levels. Such ultrasonic liquid level gauging systems typically employ ultrasonic reflectors to prevent signal loss at tank full conditions, assisting in calibrating gauges, measuring the speed-of-sound through a fluid, and/or as caps on stillwells.

An ultrasonic liquid level gauging system 1 that is representative of the prior art is shown in FIGS. 2-3. Ultrasonic liquid level gauging system 1 typically includes a transducer 8 that is configured to send and receive ultrasound signals 10 from the bottom of a fluid storage tank or container to the fluid surface. At the fluid surface, the sound typically reflects back to the transducer 8. By monitoring the time it takes for the signal to leave and return to transducer 8, in conjunction with knowing the speed of sound through the fluid, it is possible to calculate the distance from the fluid surface to transducer 8. Such techniques can be used to determine fuel levels in an aircraft fuel tank 3, for example. Typically, transducer 8 is located at or near the bottom of the aircraft fuel tank 3, in order to monitor the fluid level over a range of levels within the fuel tank.

FIG. 3 shows an ultrasonic reflector within the ultrasonic liquid level gauging system 1 of FIG. 2, that is representative of the prior art. Ultrasonic reflectors for this purpose typically include reflector targets 4 located at a predetermined distance D from the ultrasonic transmit and receive transducer 8. Reflector target 4 is typically a flat piece of metal oriented orthogonally to the ultrasonic beam. Reflector target 4 can be oriented within a stillwell 2 as a cap, or independent of a stillwell 2.

As part of the ultrasonic liquid level gauging system 1, FIG. 2 shows a stillwell 2 that is representative of the prior art. Stillwells 2 are hollow tubes disposed in a fluid that can be used in conjunction with flat reflector targets 4. For a system that sends ultrasonic signals 10 from the bottom of a fluid storage, such as an aircraft fuel tank 3, the stillwell 2 is aligned over transducer 8 and extends from the bottom of the storage towards the top of the storage. Stillwell 2 guides the ultrasound signals 10, prevents echoes from tank structures, reduces liquid level slosh above transducer 8, calms liquid surface ripples and reduces bubbles and debris from the path of ultrasound signal 10.

Some stillwells 2 use reflector targets 4 as caps on their top end in order to ensure that a signal is reflected back to the transducer 8 when liquid levels are higher than the top of the stillwell 2. Without such a reflector target 4 cap, ultrasonic signal 10 may not reflect back to transducer 8 once it leaves the stillwell 2 when liquid levels are high, for example when tank 3 is completely full of fuel, signals sent from transducer 8 go directly out of tank 3 without being reflected back, resulting in a signal loss. Such signal loss is undesirable because it can be confused with failure of transducer 8. Unfortunately, typical flat reflector targets 4, used for this purpose, collect bubbles at reflective surface 6 that diminish, distort or eliminate the return ultrasound pulse. In addition, the shape of flat reflective surface 6 limits the reflector target 4 positioning options within a fluid storage container, due to the need for precise alignment.

Reflectors are also used in ultrasonic liquid level gauging systems 1 as velocimeter targets. A submerged velocimeter target, set a known distance from an ultrasonic transmit and receive transducer, can be used to measure the speed of sound in a fluid to improve liquid level monitoring in ultrasonic liquid level gauging system. Velocimeters can be located in a common stillwell with the liquid level gauge or independently. Velocimeters are known in the art to be flat metallic surfaces submerged in fluid. The flat velocimeter targets can experience similar drawbacks as those experienced by the flat reflector caps mentioned above. Typically, flat velocimeter targets pose more drawbacks when located outside of the stillwell because the ultrasonic signals will not be guided by the stillwell. When located outside of the stillwell, the flat target's alignment with the transducer is much more critical.

Such conventional methods and systems have generally been considered satisfactory for their intended purpose. However, there is still a need in the art for ultrasonic liquid level gauging systems that allow for improved performance, including better accuracy and even alignment. There also remains a need in the art for such reflectors that are easy to make and use. The present invention provides a solution for these problems.

SUMMARY OF THE INVENTION

The subject invention is directed to a new and useful reflector target that sheds bubbles. The reflector target includes a reflector defining a tapered reflector surface. The reflector includes an apex opening and an opposed base opening, wherein the base opening has a larger perimeter than the apex opening. The tapered reflector surface extends between the openings forming a tapered passage there-between. The tapered reflector surface is configured to resist the accumulation of surface bubbles on the reflector surface by movement of along the reflector surface out through the apex opening.

In accordance with certain embodiments, the tapered reflector surface can be a truncated forty-five degree cone shape or a truncated corner-cube retro-reflector shape. The tapered reflector surface can be formed within a cylindrical cap. The apex opening and the base opening can be aligned such that a center of the base opening and a center of the apex opening define a vertical axis, for example, with the apex opening disposed higher along the vertical axis than the base opening.

The reflector target can also be disposed in a stillwell including a hollow tube defining a vertical axis and having a first end and a second end. The stillwell is configured to reduce surface level variations in a fluid. The base opening of the tapered reflector surface can face the first end of the stillwell, and the tapered reflector surface can be configured to allow fluid flow through the stillwell from the base opening of the reflector surface to the apex opening of the reflector surface. The reflector target can be adapted and configured for use in a fuel tank to reflect signals sent from a transducer back to the point of origin. It is also contemplated that the reflector target can be configured for use as a velocimeter target in a liquid level gauging system. The liquid level gauging system can be a transducer configured to transmit and receive signals. The velocimeter target is positioned at a predetermined distance from the transducer for determining the speed of sound in a liquid in which the velocimeter is submerged.

The invention also includes a liquid level gauging system. The system includes a transducer configured to send and receive signals and a stillwell, as described above, operatively associated with the transducer for guiding the signals sent and received by the transducer. The system further includes a reflector target, as described above, mounted in the stillwell a predetermined distance from the transducer.

In accordance with certain embodiments, the liquid level gauging system can include a reflector target configured for use as a velocimeter target. A velocimeter target is similar to the reflector target as described above. The tapered velocimeter surface, just as the tapered reflector surface, is configured to resist accumulation of surface bubbles on the tapered velocimeter surface by movement of bubbles along the tapered velocimeter surface out through the apex opening. The velocimeter target, however, can be dimensionally and proportionally different than the reflector target. In addition, the apex opening of the velocimeter target can have a larger perimeter than the apex opening of the reflector target.

In accordance with certain embodiments of the liquid level gauging system, as described above, the tapered velocimeter surface is a forty-five degree conical surface, and the apex and base openings of the reflector are circular. The centers of the circular apex opening and the circular base opening can be aligned along the vertical axis. The velocimeter target can be positioned below the reflector target along the vertical axis, i.e. closer to the transducer for speed of sound measurements. The conical velocimeter surface of the velocimeter reflector is configured to reflect a portion of the signals back to the transducer and to reduce the accumulation of surface bubbles on the conical velocimeter reflector surface.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 4 is a perspective view of an exemplary embodiment of an ultrasonic reflector target constructed in accordance with the present invention, showing the ultrasonic reflector target disposed in a stillwell;

FIG. 5 is an exploded perspective view of the ultrasonic reflector target and the stillwell of FIG. 4, showing the tapered reflector surface of the target;

FIG. 6 is a cross-sectional view of the ultrasonic reflector target within the stillwell of FIG. 4, shown within a fluid storage tank with bubbles shedding off the reflector surface;

DETAILED DESCRIPTION OF THE PREFERRED EMBODIMENTS

Figure 1:
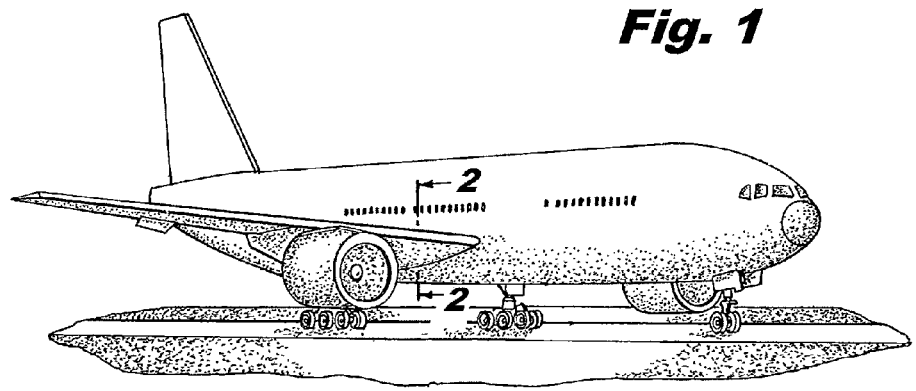
FIG. 1 is a perspective view of an aircraft.
Figure 2:
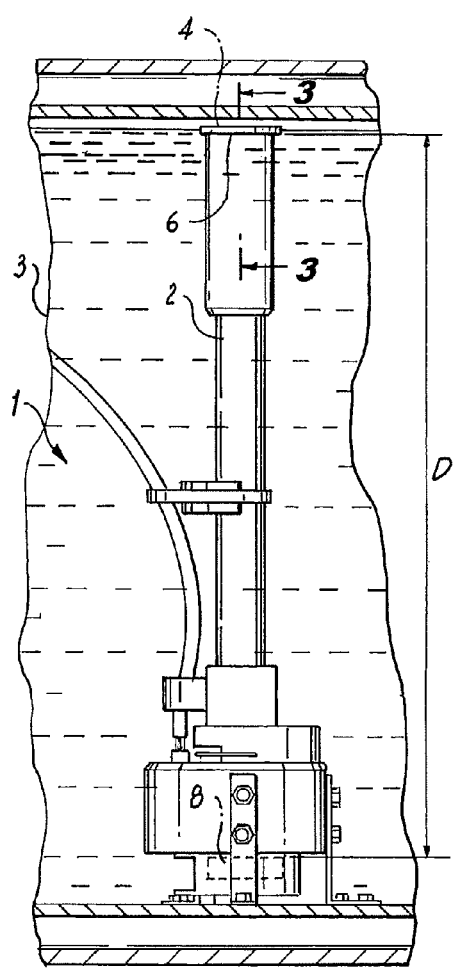
FIG. 2 is a cross-sectional view of a fuel tank within the aircraft of FIG. 1, showing a prior art ultrasonic liquid level gauging system.
Figure 3:
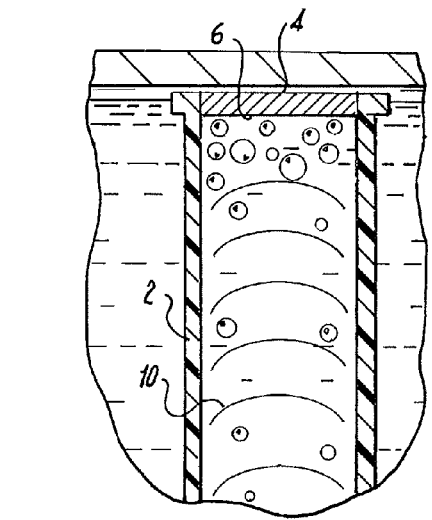
FIG. 3 is an enlarged cross-sectional view of the stillwell in the system of FIG. 2, showing bubbles accumulating on a flat reflector target.

Reference will now be made to the drawings wherein like reference numerals identify similar structural features or aspects of the subject invention. For purposes of explanation and illustration, and not limitation, a partial view of an exemplary embodiment of the ultrasonic reflector target in accordance with the invention is shown in FIG. 4 and is designated generally by reference character 100. Other embodiments of the ultrasonic reflector target in accordance with the invention, or aspects thereof, are provided in FIGS. 5-18, as will be described. The systems and methods of the invention can be used for improved monitoring and detecting of liquid levels in fluid storage tanks, such as aircraft fuel tanks.

Ultrasonic reflector target 100 is mounted to stillwell 102. Target 100 includes a reflector 104 defining a tapered reflector surface 106, as shown in FIG. 5. Reflector 104 includes an apex opening 103 and an opposed base opening 101, wherein base opening 101 tapers to the side of stillwell 102 has a larger perimeter than apex opening 103. Tapered reflector surface 106 extends between the two openings forming a tapered passage 105 there-between, as included in FIG. 6. Tapered reflector surface 106 is configured to resist the accumulation of surface bubbles on reflector surface 106 by facilitating movement of bubbles along reflector surface 106 out through apex opening 103.

With reference to FIG. 5, tapered reflector surface 106 is a truncated forty-five degree cone shape. Those skilled in the art will readily appreciate that tapered reflector surface 106 can also be formed as a truncated corner-cube, such as a corner-cube retro-reflector, without departing from the spirit and scope of invention. Tapered reflector surface 106 reduces or eliminates the need to perfectly align reflector target 100 with transducer 8. Tapered reflector surface 106 reflects at least a partial ultrasound signal back to transducer 8 even if reflector surface 106 and transducer 8 are not in perfect vertical alignment along axis A due to the tapered shape of the reflector surface 106. While described above in the exemplary context of having a forty-five degree tapered surface, those skilled in the art will readily appreciate that deviations from forty-five degrees may also provide exemplary signal return.

With further reference to FIG. 5, tapered reflector surface 106 is formed within a cylindrical cap 107. Cylindrical cap 107 is disposed within a stillwell 102 as shown in FIG. 5, but could be mounted to the tank on the outside of a stillwell 102. Those skilled in the art will readily appreciate that tapered reflector surface 106 does not have to be formed in cylindrical cap 107, but could instead be a thin walled cone, without departing from the spirit and scope of the invention.

With reference now to FIG. 6, apex opening 103 and base opening 101 are aligned such that a center of base opening 101 and a center of apex opening 103 define a vertical axis A, for example, with apex opening 103 disposed higher along vertical axis A than base opening 101. Those skilled in the art will readily appreciate that base opening 101 can be any suitable shape to match the inner surface of the stillwell and apex opening 103 can be round for a forty-five degree truncated cone shape and triangular for a truncated corner-cube retro-reflector shape, without departing from the spirit and scope of the invention.

With continued reference to FIG. 6, ultrasonic reflector target 100 is disposed in stillwell 102 the hollow tube of which defines vertical axis A. Fluid surfaces are subject to sloshing and rippling, especially in moving vehicles such as aircraft. Stillwell 102 is configured to reduce surface level variations in a fluid, guide the ultrasonic signal and reduce bubbles and debris from the ultrasonic signal path.

Figures 7, 8:
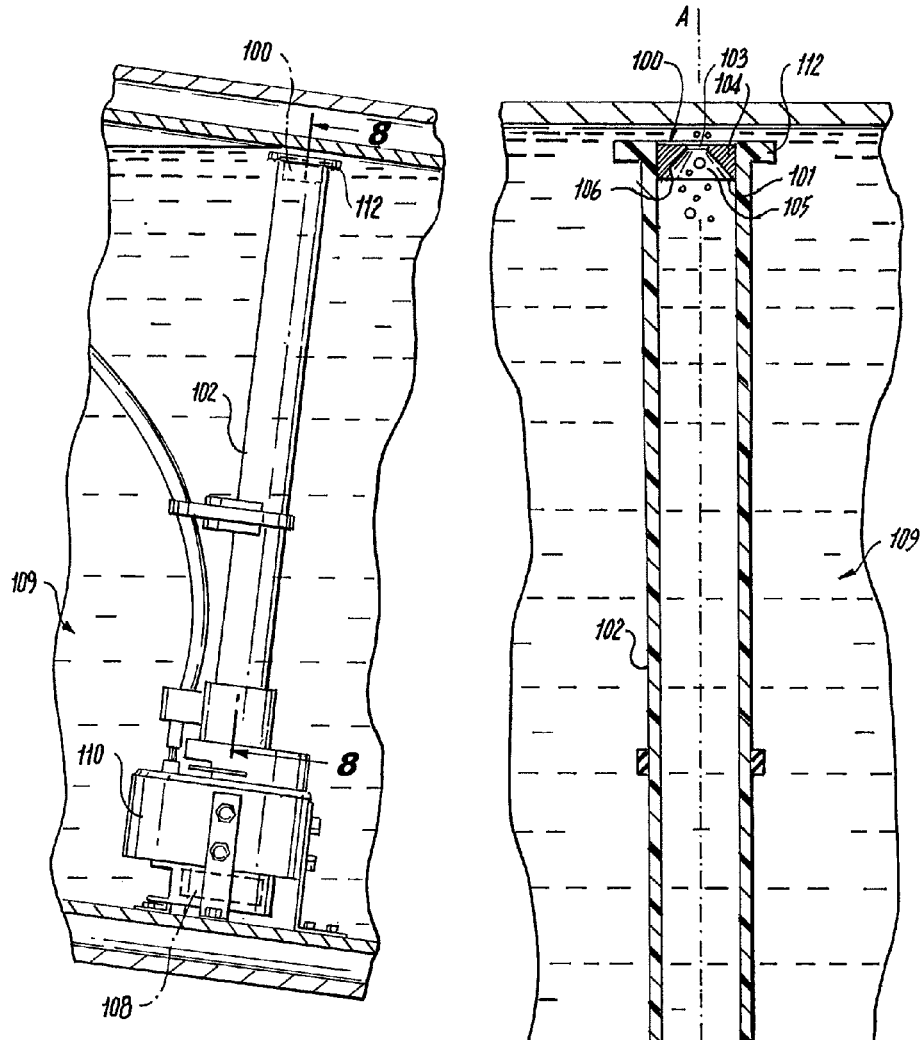
FIG. 7 is a perspective view of an exemplary embodiment of an ultrasonic liquid level gauging system constructed in accordance with the present invention, shown within a fluid storage tank.
FIG. 8 is a cross-sectional view of the ultrasonic liquid level gauging system of FIG. 7, showing an exemplary embodiment of an ultrasonic reflector target and an ultrasonic velocimeter target within a stillwell.

With reference to FIG. 7, ultrasonic liquid level gauging system 109 includes a transducer 108 configured to send and receive ultrasonic signals and a stillwell 102 as described above. Stillwell 102 is operatively associated with transducer 108 for guiding the ultrasonic signals sent and received by transducer 108. Stillwell 102 includes a first end 110 and a second end 112. Base opening 101 of reflector target 100 faces first end 110 of stillwell 102, while apex opening 103 faces away from first end 110. The system further includes an ultrasonic reflector target 100, as described above, mounted in stillwell 102 a predetermined distance from transducer 108.

With reference now to FIG. 8, tapered reflector surface 106 is configured to allow fluid flow through stillwell 102 from base opening 101 of reflector surface 106 to apex opening 103 of reflector surface 106. This allows for shedding of bubbles rather than accumulation of bubbles on reflector surface 106.

It is also contemplated that a similar type of ultrasonic reflector target can be configured for use as a velocimeter target 200. Velocimeter target 200 is part of liquid level gauging system 109 and is configured and adapted to receive an ultrasonic signal 210 from transducer 108 and return a partial ultrasonic signal 212 to transducer 108. Velocimeter target 200 is positioned at a predetermined distance from transducer 108, within stillwell 102, where it preferably remains submerged at all times. This allows the velocimeter to monitor the speed of sound in the liquid regardless of liquid levels.

Velocimeter target 200 includes a velocimeter reflector 204 defining a tapered velocimeter surface 206. Velocimeter reflector 204 includes an apex opening 203 and an opposed base opening 201, wherein base opening 201 has a larger perimeter than apex opening 203 and base opening 201 faces first end 110 of the hollow tube of stillwell 102 with tapered velocimeter surface 206 extends between openings 201, 203 forming a tapered passage 205 between two openings 201, 203, much as described above. Velocimeter target 200 is positioned below reflector target 100 along vertical axis A, i.e. closer to transducer 108.

Figure 9:
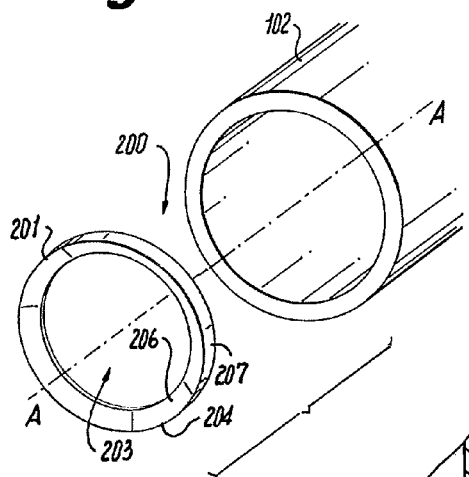
FIG. 9 is a partial exploded perspective view of the ultrasonic liquid level gauging system showing the velocimeter target of FIG. 8.

With reference to FIGS. 8-9, tapered velocimeter surface 206 is a forty-five degree conical surface, and apex 203 and base openings 201 of velocimeter reflector 204 are circular. The centers of circular apex opening 203 and circular base 201 opening are aligned along vertical axis A.

With continued reference to FIGS. 8-9, those having skill in the art will readily appreciate that tapered velocimeter surface 206 can vary in surface area size and does not have to be a forty-five degree cone shape. For example, tapered velocimeter surface 206 can form a truncated corner-cube retro-reflector shape, without departing from the spirit and scope of the invention. Apex opening 203 of velocimeter target 200 can have a larger perimeter than apex 103 opening of reflector target 100. Those skilled in the art will readily appreciate that base opening 201 can be determined by the inner diameter of the stillwell and that the velocimeter target 200 must allow most of the ultrasound to pass, but have a tapered velocimeter surface 206 large enough to return a partial signal. In addition, those skilled in the art will readily appreciate that the size of the tapered velocimeter surface 206 is also dependent upon the transducer beam shape, distance from velocimeter to transducer, and electronics.

As depicted in FIG. 9, tapered velocimeter surface 206 is formed within a solid cylindrical cap 207. Those skilled in the art will readily appreciate that tapered velocimeter surface 206 can be used without cylindrical cap 207, for example, a thin-walled cone, without departing from the spirit and scope of the invention.

Figure 10:
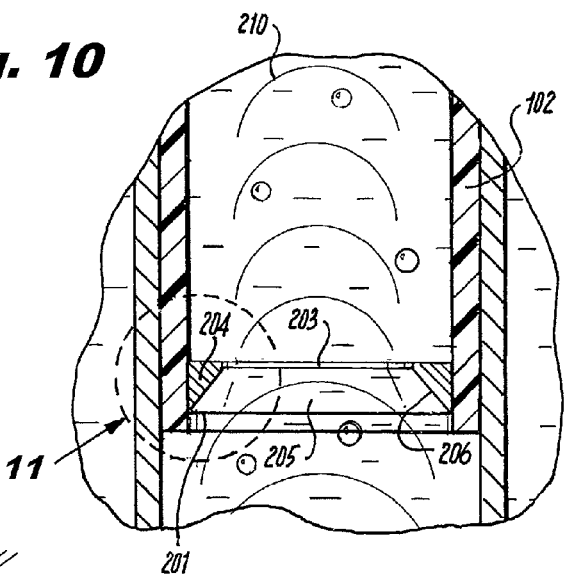
FIG. 10 is an enlarged cross-sectional elevation view of the ultrasonic liquid level gauging system of FIG. 8, showing the ultrasonic velocimeter target shedding bubbles.
Figure 11:
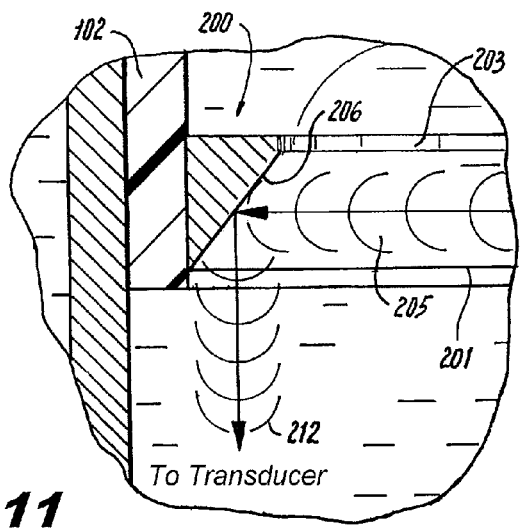
FIG. 11 is an enlarged cross-sectional elevation view of the ultrasonic velocimeter target of FIG. 10, showing the ultrasonic signal being received and reflected by the ultrasonic velocimeter target.

Referring to FIG. 10, tapered velocimeter surface 206 is configured to resist accumulation of surface bubbles on tapered velocimeter surface 206 by movement of bubbles along tapered velocimeter surface 206 out through apex opening 203. In FIG. 11, tapered velocimeter surface 206 of velocimeter reflector 204 is shown reflecting a portion of the ultrasonic signals back to transducer 108 and to reduce the accumulation of surface bubbles on tapered velocimeter surface 206. Tapered velocimeter surface 206 is configured to reflect ultrasonic signal 210 and return a partial ultrasonic signal 212 to transmit/receive transducer 108, while the remainder of ultrasonic signal 210 passes through apex opening 203, up stillwell 102 to tapered reflector surface 106, or the liquid surface, whichever is lower. This permits ultrasonic liquid level gauging system 109 to use the same transducer 108 for liquid level and speed of sound measurements because velocimeter target 200 reflects only a portion 212 of ultrasonic signal 210 back to transducer 108. The remainder of ultrasonic signal 210 is reflected from the fluid surface back to transducer 108. Or, in the case the fluid surface level exceeds the reflector surface 106, as shown in FIG. 8, reflected from tapered reflector surface 106 back to transducer 108. This ensures that ultrasonic signal 210 is always returned to transducer 108.

Figure 12:
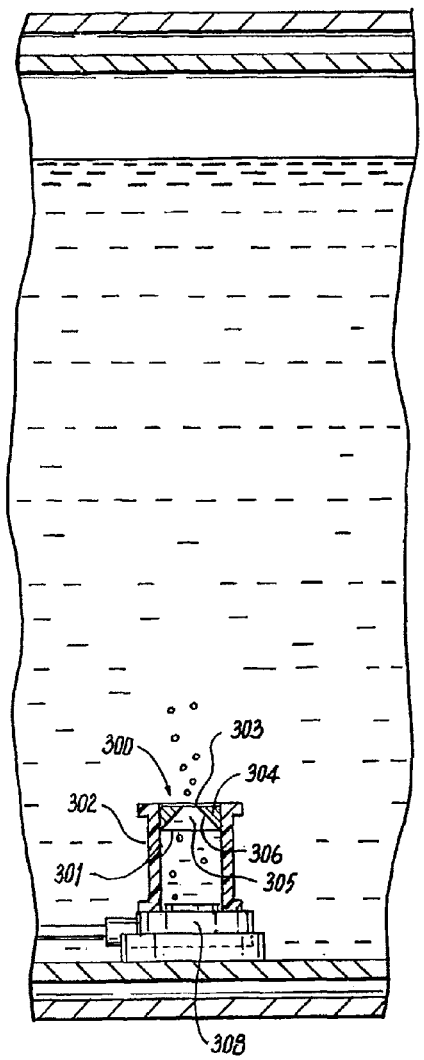
FIG. 12 is a cross-sectional elevation view of an exemplary embodiment of an ultrasonic velocimeter target within an ultrasonic liquid level gauging system constructed in accordance with the present invention, showing the velocimeter target disposed in a stillwell.

Now with reference to FIG. 12, another exemplary embodiment of a velocimeter is shown with velocimeter target 300 positioned within stillwell 302 at a predetermined distance from a dedicated transmit/receive transducer 308. In this embodiment, velocimeter reflector 304 is shown with a larger tapered velocimeter surface 306 than tapered velocimeter surface 206 of FIGS. 8-11. Unlike FIGS. 8-11, velocimeter surface 306, as shown in FIG. 12 utilizes its own transmit and receive transducer. Therefore, an ultrasonic signal from transducer 308 does not need to pass through apex opening 303 of velocimeter reflector 304. The only signal to be received by transmit/receive 308 transducer is returned from velocimeter surface 306.

Figure 13:
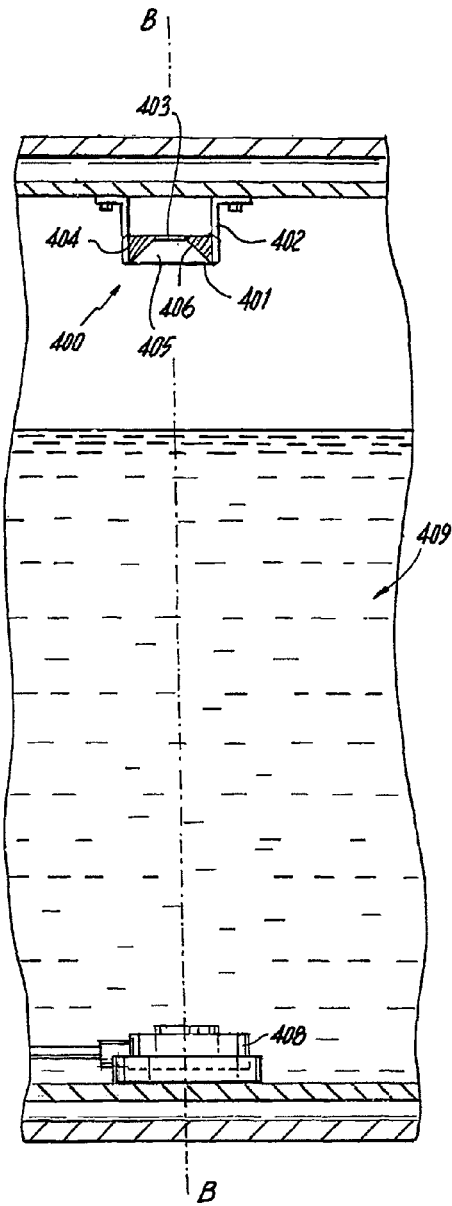
FIG. 13 is a cross-sectional elevation view of an ultrasonic liquid top-off level gauging system constructed in accordance with the present invention, showing an ultrasonic reflector target and transducer disposed within a fluid storage tank without a stillwell.

With reference to FIG. 13, another embodiment of an ultrasonic liquid level gauging system 409, is shown. In this embodiment, ultrasonic liquid level gauging system 409 includes ultrasonic reflector target 400 having a reflector 404 defining a tapered reflector surface 406. Reflector 404 includes an apex opening 403 and an opposed base opening 401, wherein base opening 401 has a larger perimeter than apex opening 403. Tapered reflector surface 406 extends between openings forming a tapered passage 405 there-between. Tapered reflector surface 406 is configured to resist the accumulation of surface bubbles on reflector surface 406 by movement of bubbles along reflector surface 406 out through apex opening 403, as described above. In contrast to embodiments shown in FIGS. 5-8, ultrasonic liquid level gauging system 409 is a top-off system and does not include a stillwell, e.g. stillwell 102, but is affixed to the top of a liquid storage by a bracket 402 or any other suitable means.

In further reference to FIG. 13, ultrasonic reflector target 400 has a dedicated transducer 408. Transducer 408 and center of ultrasonic reflector target 400 need not be aligned along the same vertical axis B. Tapered reflector surface 406 will reflect at least a portion of the ultrasonic signal back to transducer 408 even if somewhat misaligned, due to the shape of reflector surface 406. While reflector 404 is shown as a truncated forty-five degree cone shape reflector, it is advantageous to use a truncated corner-cube retro-reflector when a stillwell is not being used because a truncated corner-cube retro-reflector better reflects the signal back to the transducer when the signal is misaligned.

Those skilled in the art will readily appreciate that velocimeter target 300, stillwell 302 and transducer 308 can be used in conjunction with reflector target 400, transducer 408 and ultrasonic liquid level gauging system 409 for velocimeter enhanced liquid level gauging. Each reflector target 300 and 400 is operative with its own respective transmit and receive transducers 308, 408. Stillwell 302, along with velocimeter target 300 and transducer 308, can be disposed in one portion of the fluid storage tank, while reflector target 400 and transducer 408 can be disposed in another portion of the fluid storage.

Figure 14:
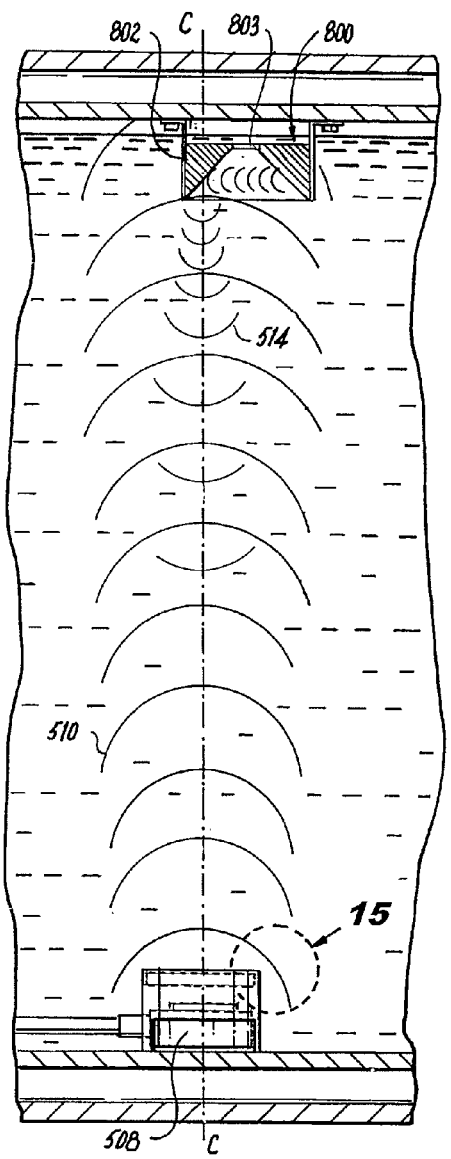
FIG. 14 is a perspective view of an exemplary embodiment of an ultrasonic liquid level gauging system, showing an ultrasonic reflector target and velocimeter target constructed in accordance with the present invention.

Now referring to FIG. 14, another exemplary embodiment of a velocimeter target 500 is shown along with ultrasonic reflector target 800. In this embodiment velocimeter target 500 is similar to velocimeter target 200 as shown in FIGS. 8-11. In the embodiment shown in FIG. 14, however, velocimeter target 500 is affixed to bracket 502 above transducer 508. Ultrasonic reflector target 800 is similar to ultrasonic reflector target 400 of FIG. 13. In the embodiment shown in FIG. 14, however, the relative dimensions and proportions of reflector target 800 and bracket 802 are different than those shown FIG. 13. Tapered reflector surface 506 will reflect at least a portion of the ultrasonic signal back to transducer 508 even if somewhat misaligned, due to the slope of reflector surface 506. Those having skill in the art will readily appreciate that the dimensions and proportions of velocimeter and reflector targets 100, 200, 300, 400, 500 and 800 can vary, so long as their respective reflector surfaces 106, 206, 306, 406, 506 and 806 are tapered at forty-five degrees or are a truncated corner-cube retro-reflector.

Figure 15:
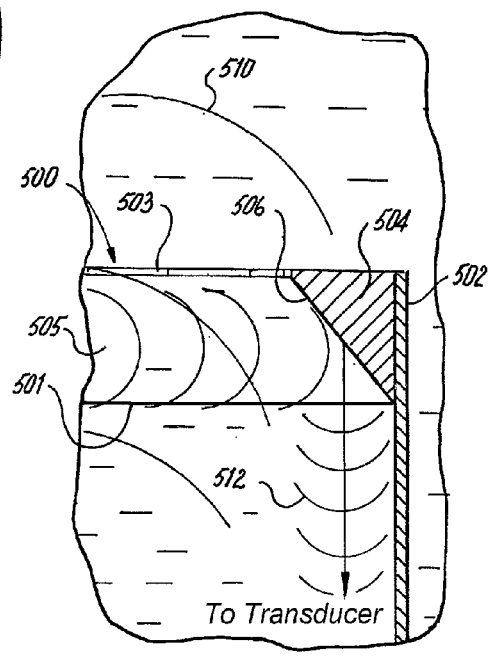
FIG. 15 is an enlarged cross-sectional elevation view of the ultrasonic velocimeter target of FIG. 14, showing a portion of the ultrasonic signal being received and reflected by the ultrasonic velocimeter target.

In reference to FIG. 15, an enlarged cross section of FIG. 14 is shown. The enlarged cross section shows tapered velocimeter surface 506 is configured to reflect signal 510 and return a partial signal 512 to transducer 508, while the remaining portion of signal 510 passes through apex opening 503 to reflector surface 806. Signals 510 and 512 are depicted schematically. When the fluid surface level is above ultrasonic reflector 800, as depicted in FIG. 15, signal 510 is reflected from ultrasonic reflector surface 806 and return signal 514 is reflected back to transducer 508.

Figure 16:
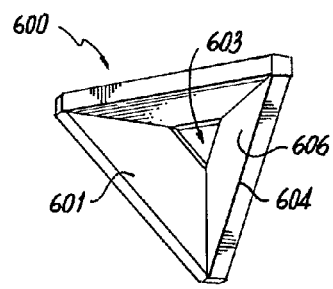
FIG. 16 is perspective view of an exemplary embodiment of a truncated corner-cube retro-reflector ultrasonic target constructed in accordance with the present invention.

As depicted in FIG. 16, another embodiment of an ultrasonic reflector target 600 includes a reflector 604 defining a tapered reflector surface 606 shaped as a truncated corner-cube retro-reflector. Reflector 604 includes an apex opening 603 and an opposed base opening 601, wherein base opening 601 has a larger perimeter than apex opening 603. Tapered reflector surface 606 extends between base opening 601 and apex opening 603, forming a tapered passage 605 there-between. Tapered reflector surface 606 is configured to resist the accumulation of surface bubbles on reflector surface 106 by movement of bubbles along reflector surface 606 out through apex opening 603.

Figure 17:
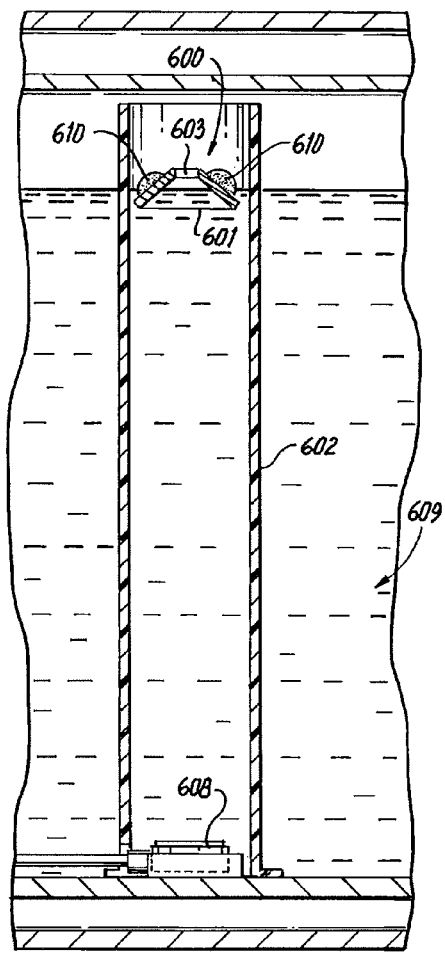
FIG. 17 is a cross-sectional elevation view of the ultrasonic reflector target shown in FIG. 16, showing the reflector target floating on a fluid surface with a transducer disposed within the fluid storage.

With reference to FIG. 17, floats 610 are mounted to ultrasonic reflector target 600. Floats 610 allow ultrasonic reflector target 600 to be disposed within a fluid storage tank without being attached to a stillwell or bracketed to the tank. In addition, floats 610 allow ultrasonic reflector target 600 to rise and fall with the fluid level. This varies from embodiments described above where ultrasonic reflector targets 100, 400 and 800 were disposed at a predetermined distance from transducers 108, 408 and 808. Those having skill in the art will readily appreciate that floats 610 can be utilized with other ultrasonic reflectors, e.g. ultrasonic reflector targets 100 and 400.

In further reference to FIG. 17, stillwell 602 and transducer 608 are also shown. Stillwell 602 is used to guide ultrasonic reflector target 600 and ensure that ultrasonic reflector target 600 remains substantially centered above transducer 608. Transducer 608 is located inside the fluid storage tank. Those having skill in the art will readily appreciate that a stillwell, e.g. stillwell 602, is not necessary in all circumstances, for example, reflector target 600 could be floating on a fluid surface without stillwell 602 because the truncated corner-cube retro-reflector shape is configured to return a signal to the transducer 608 despite misalignments.

Figure 18:
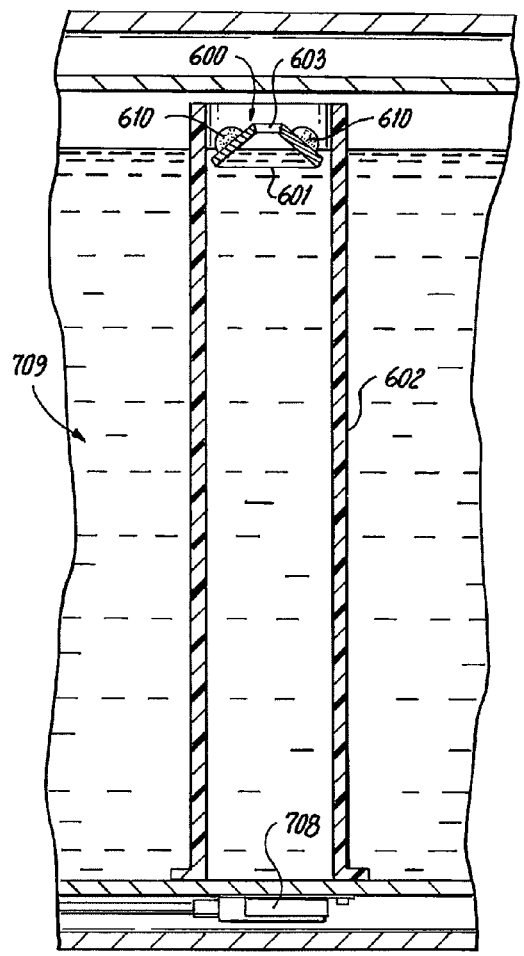
FIG. 18 is a cross-sectional elevation view of the ultrasonic reflector target shown in FIG. 16, showing the reflector target floating on a surface of a fluid with a transducer disposed outside of the fluid storage.

In reference to FIG. 18, ultrasonic reflector target 600 of FIG. 17, is shown. As shown in FIG. 18, however, transducer 708 is located outside of the fluid storage tank. Although an ultrasonic signal transmitted from transducer 708 outside of the fluid storage tank, might be weaker once in the fluid storage tank than the signal transmitted from transducer 608, within the tank. Reflecting surface 606 is able to return even a weak ultrasonic signal originating from outside of the tank. The truncated corner-cube retro-reflector shape of reflector surface 606 gives a strong return signal compared to a reflection from the fluid surface, despite the weakened signal received given the reflector geometry and bubble shedding.

In further reference to FIG. 18, ultrasonic liquid level gauging systems 709 that locate transducers, e.g. transducer 708, on the outside of the tank, eliminate the danger of wires carrying energy into a fluid storage that contains fuel or other combustible. The transmission of an ultrasonic signal through a fluid storage tank wall can distort, misalign and diminish its amplitude. But, ultrasonic reflector target 600 will provide improved reflecting performance despite the weakened ultrasonic signal.

Referring to FIGS. 16-18, the composition of the target must have an acoustic impedance that is significantly different from the liquid to assure a strong reflection. Generally, the acoustic impedance is related to the material's density. A metal such as aluminum is more dense than most liquids and is a good choice though denser metals will give a marginal improvement. In cases where conductive material in a tank is discouraged, a dense plastic or ceramic can be used. A liquid-to-air (or vacuum) interface would also give a good reflection since air is less dense than liquids. For example, a plastic ultrasonic reflector target 600 that encapsulates air can be used as a reflector.

While described above in the exemplary context of using ultrasonic signal reflectors and ultrasonic signal liquid level gauging systems, those skilled in the art will readily appreciate that various signals, for example, microwave radio frequency or optical signals can also be used.

The advantages provided by embodiments of the present invention include a tapered reflector surface, e.g. reflector surface 106, that resists the accumulation of surface bubbles on the reflector surface by movement of bubbles along the reflector surface out through the apex opening. With reduced bubble accumulation, the ultrasonic signal is less likely to be diminished, distorted or eliminated, therein reducing the possibility of an undesirable signal loss. In addition, embodiments of the present invention increase target positioning options within a fluid storage container, due to the tapered reflector surface.

The methods and systems of the present invention, as described above and shown in the drawings, provide for ultrasonic reflectors with superior properties including a bubble shedding reflective surfaces. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A reflector target comprising:
a reflector defining a tapered reflector surface, the reflector including an apex opening and an opposed base opening, wherein the base opening has a larger perimeter than the apex opening, the tapered reflector surface extending between the openings forming a tapered passage between the two openings, wherein the tapered reflector surface is configured to resist the accumulation of surface bubbles on the reflector surface by movement of bubbles along the reflector surface out through the apex opening.

2. A reflector target as recited in claim 1, wherein the tapered reflector surface is a truncated forty-five degree cone shape.

3. A reflector target as recited in claim 1, wherein the tapered reflector surface is a truncated corner-cube retro-reflector shape.

4. A reflector target as recited in claim 1, wherein the tapered reflector surface is formed within a cylindrical cap.

5. A reflector target as recited in claim 1, wherein the apex opening and the base opening are aligned such that a center of the base opening and a center of the apex opening define a vertical axis.

6. A reflector target as recited in claim 5, wherein the apex opening is disposed higher along the vertical axis than the base opening.

7. A reflector target as recited in claim 1, wherein the reflector target is disposed in a stillwell, the stillwell including a hollow tube defining a vertical axis, the hollow tube having a first end and a second end, wherein the base opening of the tapered reflector surface faces the first end of the stillwell, and wherein the tapered reflector surface is configured to allow fluid flow through the stillwell from the base opening of the reflector surface to the apex opening of the reflector surface, wherein the stillwell is configured to reduce surface level variations in a fluid.

8. A reflector target as recited in claim 1, wherein the reflector target is adapted and configured for use in a fuel tank to reflect ultrasonic signals sent from a transducer back to the point of origin.

9. A reflector target as recited in claim 1, wherein the reflector target is configured for use as a velocimeter target, wherein the velocimeter target is configured for use in a liquid level gauging system, the liquid level gauging system including a transducer configured to transmit and receive signals, the velocimeter target positioned at a predetermined distance from the transducer.

10. A liquid level gauging system comprising:
a transducer configured to send and receive signals;
a stillwell operatively associated with the transducer guiding the signals sent and received by the transducer, the stillwell including a hollow tube defining a vertical axis, the hollow tube having a first end and a second end along the vertical axis, wherein the stillwell is configured to reduce surface level variations in the fluid; and
a reflector target mounted in the stillwell a predetermined distance from the transducer, wherein the reflector target is configured to allow fluid flow through the stillwell, the reflector target includes a reflector defining a tapered reflector surface, the reflector including an apex opening and an opposed base opening, wherein the base opening has a larger perimeter than the apex opening and wherein the base opening faces the first end of the hollow tube, the tapered reflector surface extending between the openings forming a tapered passage between the two openings, and wherein the tapered reflector surface is configured to resist accumulation of surface bubbles on the tapered reflector surface by movement of bubbles along the tapered reflector surface out through the apex opening.

11. A liquid level gauging system as recited in claim 10, wherein the tapered reflector surface is a truncated forty-five degree cone shape.

12. A liquid level gauging system as recited in claim 10, wherein the tapered reflector surface is a truncated corner-cube retro-reflector shape.

13. A liquid level gauging system as recited in claim 10, wherein the tapered reflector surface is formed within a cylindrical cap.

14. A liquid level gauging system as recited in claim 10, wherein the apex opening and the base opening are aligned along the vertical axis.

15. A liquid level gauging system as recited in claim 14, wherein the apex opening is disposed higher along the vertical axis than the base opening.

16. A liquid level gauging system as recited in claim 10, wherein the liquid level gauging system is adapted and configured for use in an aircraft fuel tank.

17. An liquid level gauging system as recited in claim 10, further comprising a velocimeter target mounted in the stillwell at a predetermined distance from the transducer, wherein the velocimeter target is configured to allow fluid flow through the stillwell, the velocimeter target includes a velocimeter reflector defining a tapered velocimeter surface, the velocimeter reflector including an apex opening and an opposed base opening, wherein the base opening has a larger perimeter than the apex opening and the base opening faces the first end of the hollow tube, the tapered velocimeter surface extends between the openings forming a tapered passage between the two openings, wherein the tapered velocimeter surface is configured to resist accumulation of surface bubbles on the tapered velocimeter surface by movement of bubbles along the tapered reflector surface out through the apex opening.

18. A liquid level gauging system as recited in claim 17, wherein the tapered velocimeter surface is a forty-five degree cone shape.

19. A liquid level gauging system as recited in claim 17, wherein the apex opening of the velocimeter target has a larger perimeter than the apex opening of the reflector target.

20. A liquid level gauging system comprising:
a transducer, wherein the transducer is configured to send and receive signals;
a stillwell operatively associated with the transducer guiding the signals sent and received by the transducer, the stillwell including a hollow tube defining a vertical axis, the hollow tube having a first end and a second end along the vertical axis, wherein the stillwell is configured to reduce surface level variations in the fluid; and
a reflector target mounted in the stillwell, wherein the reflector target is configured to allow fluid flow through the stillwell, the reflector target includes a reflector defining a forty-five degree conical reflector surface, the reflector including a circular apex opening and an opposed circular base opening, the conical reflector surface extending between the openings forming a conical passage between the two openings, wherein the conical reflector surface is configured to resist accumulation of surface bubbles on the conical reflector surface by movement of bubbles along the conical reflector surface out through the apex opening; and
a velocimeter target mounted in the stillwell, wherein the velocimeter target is configured to allow fluid flow through the stillwell, the velocimeter target includes a velocimeter reflector defining a forty-five degree conical velocimeter surface, the velocimeter reflector including a circular apex opening and an opposed circular base opening, wherein a center of the circular apex opening and a center of the circular base opening are aligned along the vertical axis, the conical velocimeter surface extending between the openings forming a conical passage between the two openings, wherein the velocimeter target is positioned below the reflector target along the vertical axis closer to the transducer, wherein the conical velocimeter surface of the velocimeter reflector is configured to reflect a portion of the signals back to the transducer, and wherein the conical velocimeter surface is configured to reduce the accumulation of surface bubbles on the conical velocimeter reflector surface.

\* \* \* \* \*